(12) United States Patent
Tang et al.

(10) Patent No.: US 11,796,052 B2
(45) Date of Patent: Oct. 24, 2023

(54) GEAR SHIFTING APPARATUS, ELECTRIC DRIVE SYSTEM, AND NEW ENERGY VEHICLE

(71) Applicant: Huawei Digital Power Technologies Co., Ltd., Shenzhen (CN)

(72) Inventors: Zhengyi Tang, Shenzhen (CN); Hai Guo, Shenzhen (CN); Huan Wang, Shenzhen (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/886,022

(22) Filed: Aug. 11, 2022

(65) Prior Publication Data

US 2022/0381337 A1    Dec. 1, 2022

(30) Foreign Application Priority Data

Aug. 12, 2021   (CN) .......................... 202110924627.6

(51) Int. Cl.
*F16H 61/00* (2006.01)
*F16H 37/08* (2006.01)
(Continued)

(52) U.S. Cl.
CPC ..... *F16H 61/0059* (2013.01); *F16H 37/0813* (2013.01); *F16H 61/2807* (2013.01); *F16H 61/682* (2013.01)

(58) Field of Classification Search
CPC ............. F16H 61/0059; F16H 61/2807; F16H 61/682; F16H 37/0813; F16H 3/089; F16H 3/10; F16H 2200/0021; F16H 2200/0034; F16H 2200/32; F16H 61/0213; F16H 61/32; F16H 63/3408; F16H 63/3458; F16H 3/32; B60K 2001/001; B60K 1/00; B60K 17/08; B60K 17/00; B60K 17/02; B60K 17/06; B60Y 2200/91

See application file for complete search history.

(56) References Cited

U.S. PATENT DOCUMENTS 4,534,236 A *  8/1985  Nishikawa ............... F16F 15/10
                                                            192/48.91
9,242,623 B2 * 1/2016  Burgardt ................. B60T 1/005
(Continued)

FOREIGN PATENT DOCUMENTS

CN        205896146 U     1/2017
CN        109281997 A     1/2019
(Continued)

*Primary Examiner* — Tinh Dang
(74) *Attorney, Agent, or Firm* — Conley Rose, P.C.

(57) ABSTRACT

A gear shifting apparatus in a new energy vehicle includes a primary power transmission unit, a secondary power transmission unit, an intermediate shaft, an intermediate shaft gear, a first clutch unit, a second clutch unit, and a third clutch unit. The intermediate shaft gear is fixedly sleeved on the intermediate shaft, and the first clutch unit is disposed between the intermediate shaft and the primary power transmission unit. The second clutch unit is disposed between the intermediate shaft and the secondary power transmission unit. The third clutch unit is disposed between the primary power transmission unit and the intermediate shaft gear.

20 Claims, 4 Drawing Sheets

(51) Int. Cl.
*F16H 61/28* (2006.01)
*F16H 61/682* (2006.01)
*F16H 3/10* (2006.01)
*F16H 3/089* (2006.01)
*B60K 17/08* (2006.01)

(56) References Cited

U.S. PATENT DOCUMENTS

| | | | |
|---|---|---|---|
| 2014/0033844 A1* | 2/2014 | Rothvoss | F16H 3/089 74/335 |
| 2016/0017958 A1* | 1/2016 | Wu | F16H 3/006 74/665 D |
| 2018/0001760 A1* | 1/2018 | Eo | F16H 3/10 |
| 2021/0323536 A1 | 10/2021 | Chen et al. | |
| 2022/0307572 A1* | 9/2022 | Zhong | B60K 17/08 |

FOREIGN PATENT DOCUMENTS

| | | | | |
|---|---|---|---|---|
| CN | 109941244 | A | 6/2019 | |
| CN | 208931324 | U | 6/2019 | |
| CN | 110513445 | A | 11/2019 | |
| CN | 112923044 | A | 6/2021 | |
| CN | 114508568 | A | 5/2022 | |
| DE | 102012015863 | A1 | 5/2014 | |
| DE | 102020202788 | B3 | 4/2021 | |
| WO | WO-2019152065 | A1 * | 8/2019 | B60K 1/00 |
| WO | 2021089469 | A1 | 5/2021 | |

\* cited by examiner

GEAR SHIFTING APPARATUS, ELECTRIC DRIVE SYSTEM, AND NEW ENERGY VEHICLE

CROSS-REFERENCE TO RELATED APPLICATIONS

This application claims priority to Chinese Patent Application No. 202110924627.6, filed on Aug. 12, 2021, the disclosure of which is hereby incorporated by reference in its entirety.

TECHNICAL FIELD

This disclosure relates to the technical field of new energy vehicles, and in particular, to a gear shifting apparatus, an electric drive system, and a new energy vehicle.

BACKGROUND

A braking system of an automobile is a system that forcibly brakes the automobile to some extent by applying specific braking force to a wheel of the automobile. The braking system is used to force a traveling automobile to decelerate or even stop based on a requirement of a driver or a controller, or to enable a stopped automobile to park stably under various road conditions (for example, on a rampway), or to enable an automobile that travels downhill to keep a stable speed.

Compared with a conventional mechanical handbrake, an electronic parking brake (EPB) system may control a direct current motor of a parking brake apparatus that is mounted on a wheel side, to clamp and release a wheel and provide proper braking force for a vehicle based on different road conditions. In this way, electronic parking of the vehicle is implemented. On a vehicle equipped with an EPB system, a user can brake the vehicle by using a simple switching operation (an electronic handbrake button), and does not change a braking effect due to intensity of force of the user. In a traveling process, the EPB system can also be used to brake a traveling vehicle, to provide specific braking force in an emergency situation and avoid an accident.

Currently, most new energy vehicles on the market use a single-control EPB system or a dual-control EPB system. No redundancy design is disposed for the single-control EPB, and there is a safety risk. In the dual-control EPB system, two controllers are used, and each controller independently controls one parking module, and consequently relatively large space is occupied, and this is not conducive to lightweight development of the new energy vehicles.

SUMMARY

Embodiments of this disclosure provide a gear shifting apparatus, an electric drive system, and a new energy vehicle that can reduce occupied space.

According to a first aspect, this disclosure provides a gear shifting apparatus, including a primary power transmission unit, a secondary power transmission unit, an intermediate shaft, an intermediate shaft gear, a first clutch unit, a second clutch unit, and a third clutch unit. The intermediate shaft gear is fixedly sleeved on the intermediate shaft; the first clutch unit is disposed between the intermediate shaft and the primary power transmission unit, and the first clutch unit can achieve or break power transmission between the primary power transmission unit and the intermediate shaft; the second clutch unit is disposed between the intermediate shaft and the secondary power transmission unit, and the second clutch unit is configured to achieve or break power transmission between the secondary power transmission unit and the intermediate shaft; the third clutch unit is disposed between the primary power transmission unit and the intermediate shaft gear, and the third clutch unit is configured to achieve or break power transmission between the primary power transmission unit and the intermediate shaft gear; and when the first clutch unit achieves power transmission between the intermediate shaft and the primary power transmission unit, the second clutch unit achieves power transmission between the intermediate shaft and the secondary power transmission unit, and the third clutch unit achieves power transmission between the intermediate shaft gear and the primary power transmission unit, the gear shifting apparatus is in a self-locking state.

"Achieve" as used herein means that power (for example, torque) can be transmitted between "A" and "B", and "break" as used herein means that power cannot be transmitted between "A" and "B". For example, that the first clutch unit achieves power transmission between the primary power transmission unit and the intermediate shaft means that power can be transmitted between the primary power transmission unit and the intermediate shaft, and that the first clutch unit breaks power transmission between the primary power transmission unit and the intermediate shaft means that power cannot be transmitted between the primary power transmission unit and the intermediate shaft.

When the first clutch unit achieves power transmission between the intermediate shaft and the primary power transmission unit, the second clutch unit achieves power transmission between the intermediate shaft and the secondary power transmission unit, and the third clutch unit achieves power transmission between the intermediate shaft gear and the primary power transmission unit, self-locking of the gear shifting apparatus can be implemented, and the intermediate shaft cannot rotate. For example, a transmission ratio obtained when the third clutch unit is combined with the intermediate shaft gear may be set to be different from a transmission ratio obtained when the second clutch unit is combined with the intermediate shaft, so that when the first clutch unit achieves power transmission between the intermediate shaft and the primary power transmission unit, the second clutch unit achieves power transmission between the intermediate shaft and the secondary power transmission unit, and the third clutch unit achieves power transmission between the intermediate shaft gear and the primary power transmission unit, the intermediate shaft cannot rotate, and self-locking of the gear shifting apparatus is implemented. In other words, only "gears" of the second clutch unit and the third clutch unit need to be engaged to implement self-locking of the gear shifting apparatus. Therefore, operations are simple and fast.

When the gear shifting apparatus is applied to a new energy vehicle, the intermediate shaft of the gear shifting apparatus is connected to a wheel for power transmission, and the gear shifting apparatus can transmit power of a drive motor to the wheel, so that the wheel rotates. When the new energy vehicle with the gear shifting apparatus needs to brake to park, the gear shifting apparatus enters the self-locking state, and the intermediate shaft cannot rotate, so that rotation of the wheel can be prevented, and therefore a possibility that the wheel rotates is reduced. In other words, the gear shifting apparatus is equivalent to another parking brake system of the new energy vehicle, so that double insurance is provided during parking of the new energy vehicle, and a possibility of occurrence of an accident is reduced. There is no need to add an additional parking mechanism, and a gear shifting apparatus of an electric drive system and an EPB system of the new energy vehicle form an EPB redundant system. Therefore, while safety of the new energy vehicle is improved, a volume occupied by the EPB redundant system can be reduced, and lightweight development of the new energy vehicle is facilitated.

According to the first aspect, in a first possible implementation of the first aspect of this disclosure, when the first clutch unit achieves power transmission between the intermediate shaft and the primary power transmission unit, the second clutch unit achieves power transmission between the intermediate shaft and the secondary power transmission unit, and the third clutch unit breaks power transmission between the intermediate shaft gear and the primary power transmission unit, the gear shifting apparatus is in a non-self-locking state. That the gear shifting apparatus is in a non-self-locking state means that the intermediate shaft can rotate, and the gear shifting apparatus can transmit power, for example, transmit power of the drive motor to the wheel, so that the wheel rotates. For example, when the gear shifting apparatus is in the non-self-locking state, the third clutch unit is separated from the intermediate shaft gear, the third clutch unit does not interfere with movement of the intermediate shaft, and the gear shifting apparatus can perform normal gear-shifting power transmission.

According to the first aspect or the first possible implementation of the first aspect of this disclosure, in a second possible implementation of the first aspect of this disclosure, the third clutch unit includes a third clutch, an actuator, and an actuator connecting piece, the third clutch is disposed between the intermediate shaft gear and the primary power transmission unit, the actuator connecting piece is connected to the actuator, and the actuator is configured to control the actuator connecting piece so that the third clutch achieves or breaks power transmission between the intermediate shaft gear and the primary power transmission unit.

The actuator connecting piece is controlled to move in an axial direction of the intermediate shaft, so that a "gear" of the third clutch unit can be engaged. Therefore, operations are simple, convenient, and fast.

According to the first aspect or the first and the second possible implementations of the first aspect of this disclosure, in a third possible implementation of the first aspect of this disclosure, the primary power transmission unit includes a primary power transmission input gear and a primary power transmission output gear, the primary power transmission output gear meshes with the primary power transmission input gear, the first clutch unit is disposed between the primary power transmission output gear and the intermediate shaft, and the third clutch is mounted between the primary power transmission output gear and the intermediate shaft gear.

The primary power transmission unit includes the primary power transmission input gear and the primary power transmission output gear, to improve flexibility of internal component layout of the gear shifting apparatus and reduce space occupied by the gear shifting apparatus.

According to the first aspect or the first to the third possible implementations of the first aspect of this disclosure, in a fourth possible implementation of the first aspect of this disclosure, the first clutch unit includes a one-way clutch, and the one-way clutch is mounted between the primary power transmission output gear and the intermediate shaft.

The first clutch unit uses a one-way clutch, the one-way clutch can achieve power transmission between the intermediate shaft and the primary power transmission unit when rotating in a rotation direction, and the one-way clutch can break power transmission between the intermediate shaft and the primary power transmission unit when rotating in another rotation direction. The one-way clutch eliminates the need for an additional manipulation mechanism, so that a structure of the gear shifting apparatus is simplified, and space occupied by the gear shifting apparatus is reduced.

According to the first aspect or the first to the fourth possible implementations of the first aspect of this disclosure, in a fifth possible implementation of the first aspect of this disclosure, the third clutch is a toothed clutch, and the actuator is configured to control the actuator connecting piece to move in the axial direction of the intermediate shaft, so that the third clutch meshes with the intermediate shaft gear to achieve power transmission between the intermediate shaft gear and the primary power transmission unit, or the third clutch is separated from the intermediate shaft gear to break power transmission between the intermediate shaft gear and the primary power transmission unit.

The third clutch is a toothed clutch, and the actuator connecting piece moves in the axial direction of the intermediate shaft, so that gear shifting can be implemented, and it is convenient for the gear shifting apparatus to become compact and light in weight.

According to the first aspect or the first to the fifth possible implementations of the first aspect of this disclosure, in a sixth possible implementation of the first aspect of this disclosure, the secondary power transmission unit includes a secondary power transmission input gear and a secondary power transmission output gear, the secondary power transmission output gear meshes with the secondary power transmission input gear, and the second clutch unit is disposed between the secondary power transmission output gear and the intermediate shaft.

The secondary power transmission unit includes the secondary power transmission input gear and the secondary power transmission output gear, to improve flexibility of internal component layout of the gear shifting apparatus and reduce space occupied by the gear shifting apparatus.

According to the first aspect or the first to the fifth possible implementations of the first aspect of this disclosure, in a sixth possible implementation of the first aspect of this disclosure, the second clutch unit includes a friction plate clutch or an electromagnetic clutch.

According to the first aspect or the first to the sixth possible implementations of the first aspect of this disclosure, in a seventh possible implementation of the first aspect of this disclosure, the gear shifting apparatus further includes a differential unit, and the differential unit is connected to the intermediate shaft for power transmission. The differential unit is configured to connect to the wheel. The differential unit is configured to adjust a rotation speed difference of wheels.

According to the first aspect or the first to the seventh possible implementations of the first aspect of this disclosure, in an eighth possible implementation of the first aspect of this disclosure, the differential unit includes a main speed reducer power transmission input gear, a main speed reducer power transmission output gear, and a differential, the main speed reducer power transmission input gear is sleeved on the intermediate shaft and can rotate with the intermediate shaft, the main speed reducer power transmission output gear meshes with the main speed reducer power transmission input gear, and the differential is connected to the main speed reducer power transmission output gear for power transmission. In this way, flexibility of internal component layout of the gear shifting apparatus is improved, and space occupied by the gear shifting apparatus is reduced.

According to the first aspect or the first to the eighth possible implementations of the first aspect of this disclosure, in a ninth possible implementation of the first aspect of this disclosure, a transmission ratio obtained when the third clutch unit is combined with the intermediate shaft gear is different from a transmission ratio obtained when the second clutch unit is combined with the intermediate shaft.

According to a second aspect, this disclosure provides an electric drive system, including a drive motor, the gear shifting apparatus according to the first aspect of this disclosure or the first to the ninth possible implementations of the first aspect, where the drive motor includes a drive body and an input shaft, the drive body is configured to drive the input shaft to rotate, the input shaft is connected to the primary power transmission unit for power transmission, and the input shaft is connected to the secondary power transmission unit for power transmission.

The gear shifting apparatus can perform self-locking, to improve safety and reliability of a new energy vehicle with the electric drive system when the new energy vehicle brakes to park.

According to a third aspect, this disclosure provides a new energy vehicle, including a vehicle controller, the electric drive system provided in the second aspect, and an EPB system. The electric drive system further includes an automatic gear shifting control module and a wheel, an intermediate shaft is connected to the wheel for power transmission by using a differential unit, the vehicle controller is communicatively connected to the automatic gear shifting control module, the vehicle controller is communicatively connected to an EPB control module, and the vehicle controller is configured to send a parking signal to the automatic gear shifting control module to enable a gear shifting apparatus to enter a self-locking state and control the EPB system to apply braking force to the wheel.

There is no need to add an additional parking mechanism or an additional control module, and a gear shifting apparatus of the electric drive system and the EPB system of the new energy vehicle form an EPB redundant system. Therefore, while safety of the new energy vehicle is improved, a volume occupied by the EPB redundant system can be reduced, and lightweight development of the new energy vehicle is facilitated.

In addition, the gear shifting apparatus and the EPB system are separately controlled, so that control precision of the new energy vehicle can be improved.

According to the third aspect, in a first possible implementation of the third aspect of this disclosure, the EPB system includes a parking module and an EPB control module, the parking module includes a parking drive unit and a parking brake execution unit, the parking drive unit is configured to drive the parking brake execution unit to apply braking force to the wheel, and the parking drive unit of the parking module is communicatively connected to the EPB control module.

According to the third aspect or the first possible implementation of the third aspect of this disclosure, there is at least one EPB control module, there is at least one parking module, and each parking module is correspondingly communicatively connected to one EPB control module, to improve control precision and control efficiency.

According to the third aspect or the first possible implementation of the third aspect of this disclosure, there are two parking modules, there is one EPB control module, and parking drive units in both the two parking modules are communicatively connected to the EPB control module. Because the two parking modules share one EPB control module, space occupied by the new energy vehicle is reduced, and costs are reduced.

DESCRIPTION OF EMBODIMENTS

An EPB system for a new energy vehicle includes a first braking controller, a first parking module controlled by the first braking controller, a second braking controller, and a second parking module controlled by the second braking controller. The first braking controller and the second braking controller are control function units that independently complete parking control functions. However, because two braking controllers are used to perform control, relatively large space is occupied, and this is not conducive to lightweight development of the new energy vehicle.

Figure 1:
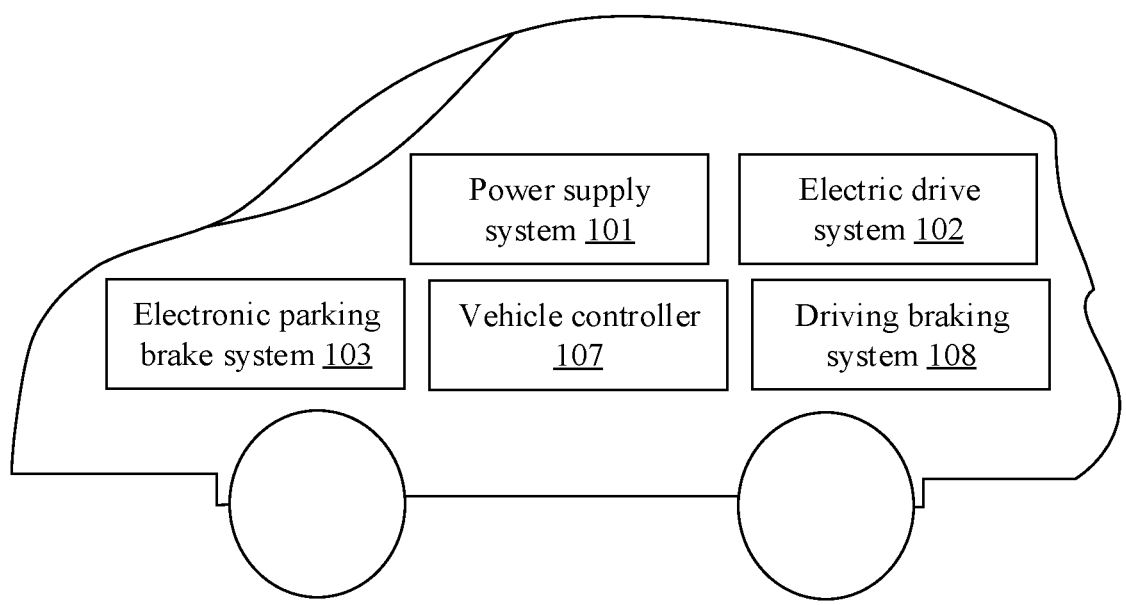
FIG. 1 is a schematic diagram of a new energy vehicle according to a first implementation of this disclosure.
Figure 2:
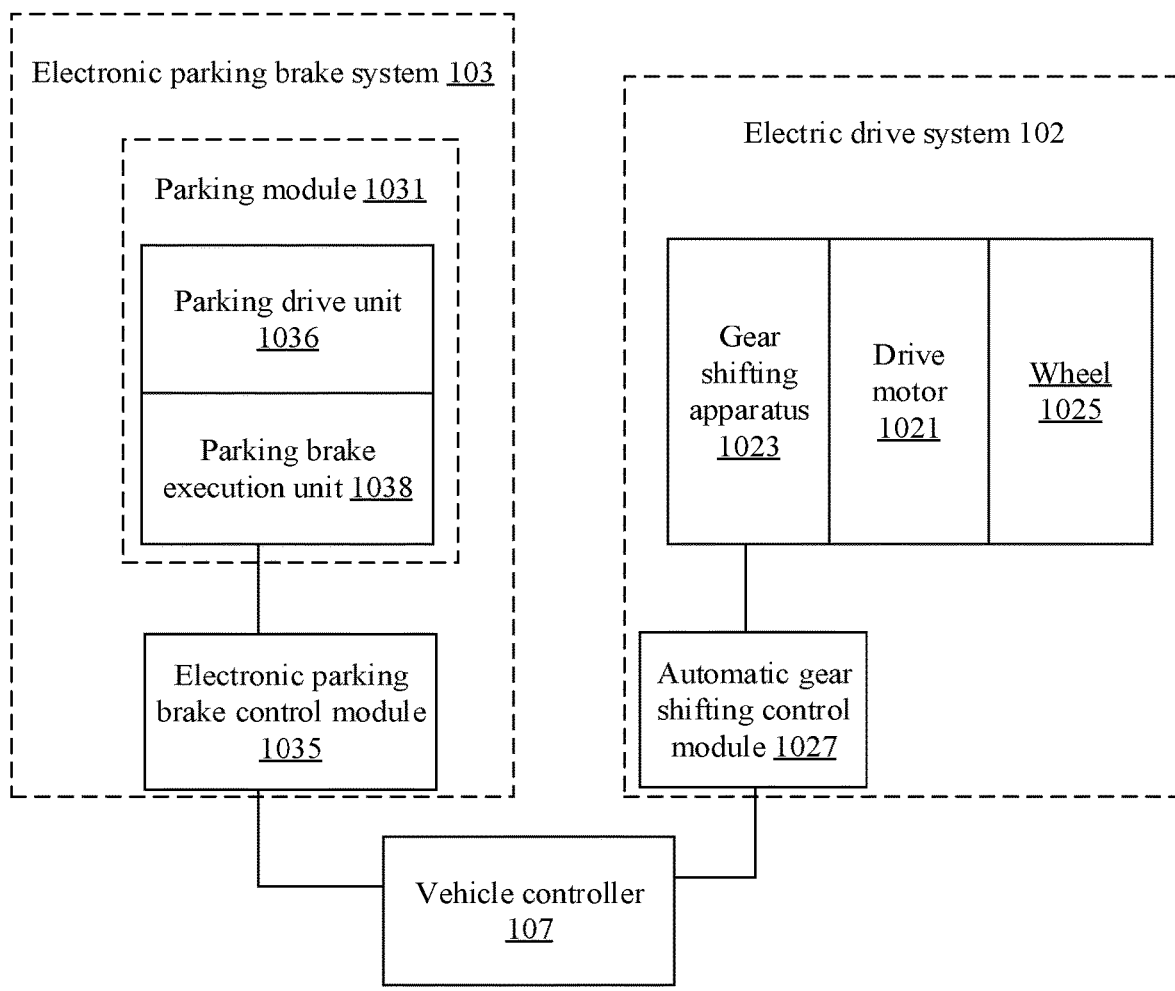
FIG. 2 is a block diagram of a structure of a new energy vehicle according to a first implementation of this disclosure.

Based on this, referring to FIG. 1 and FIG. 2, a first implementation of this disclosure provides a new energy vehicle 1000. The new energy vehicle provides power for a vehicle by using a motor drive system. Compared with a combination of an engine and a gear shifting apparatus of a conventional fuel vehicle, a largest advantage of pure electronic drive is flexible arrangement of a motor. A drive solution of a single drive motor may be used, and a drive solution of a plurality of drive motors may also be used, and even a drive solution of distributed wheel-hub motors (for example, wheel-side motors) may be used. Through flexible combination, vehicle space can be released as much as possible while economy and power of the vehicle are ensured.

The new energy vehicle 1000 includes a power supply system 101, an electric drive system 102, an EPB system 103, and a vehicle controller or vehicle control unit (VCU) 107. It may be understood that the new energy vehicle 1000 may further include another necessary or unnecessary structure, component, and the like, for example, an auxiliary system. Details are not described herein.

The power supply system 101 includes a battery power supply, an energy management system, a charging controller, and the like, and is configured to provide electric energy.

The electric drive system 102 is configured to efficiently convert electric energy stored in the battery power supply of the power supply system 101 into kinetic energy of the new energy vehicle 1000. The electric drive system 102 includes a drive motor 1021, a gear shifting apparatus 1023, a wheel 1025, and an automatic gear shifting control module 1027. The drive motor 1021 is connected to the wheel 1025 by using the gear shifting apparatus 1023 for power transmission. The automatic gear shifting control module 1027 is configured to control the gear shifting apparatus 1023. Through use of the automatic gear shifting control module 1027, the gear shifting apparatus 1023 can change values and directions of torque and a rotation speed, to change a transmission ratio of the gear shifting apparatus 1023, that is, implement gear shifting, to change the speed and change the torque. The gear shifting apparatus 1023 includes a self-locking state and a non-self-locking state. When the gear shifting apparatus 1023 is in the self-locking state, the gear shifting apparatus 1023 cannot transmit power of the drive motor 1021 to the wheel 1025. When the gear shifting apparatus 1023 is in the non-self-locking state, the gear shifting apparatus 1023 can transmit power of the drive motor 1021 to the wheel 1025. The electric drive system 102 may further include a central control unit, a drive controller, and the like.

The EPB system 103 is configured to provide braking force for the wheel 1025, to implement electronic parking. The EPB system 103 includes a parking module 1031 and an EPB control module 1035. In this implementation, there is at least one EPB control module 1035, there is at least one parking module 1031, and each parking module 1031 is correspondingly communicatively connected to one EPB control module 1035, to improve control precision and control efficiency. The parking module 1031 includes a parking drive unit 1036 and a parking brake execution unit 1038. The parking drive unit 1036 is configured to provide power for the parking brake execution unit 1038. The parking brake execution unit 1038 is configured to provide parking braking force for the wheel 1025. The parking brake execution unit 1038 may clamp or release the wheel 1025. In this implementation, the parking drive unit 1036 includes a drive apparatus such as a motor.

The vehicle controller 107 is a core control component of the new energy vehicle 1000, and undertakes functions such as data exchange and management, fault diagnosis, safety monitoring, and driver intention parsing of each system of the new energy vehicle 1000. The vehicle controller 107 is communicatively connected to the power supply system 101, the electric drive system 102, the EPB system 103, and the like. The vehicle controller 107 may include one or more processors. The processor may include one or more processors (logic circuits) that provide an information processing capability in the new energy vehicle 1000. The processor may provide one or more computing functions for the new energy vehicle 1000. The processor may send a command signal to one or more components of the new energy vehicle 1000 to manipulate the new energy vehicle 1000. The processor may include a memory, such as a random-access memory or storage device (RAM), a flash memory, or another suitable type of storage device, such as a non-transient computer-readable memory. The memory of the processor may include an executable instruction and data that may be accessed by the one or more processors of the processor. For example, the processor may include one or more dynamic random-access memory (DRAM) modules, such as a double data rate synchronous DRAM (DDR SDRAM). In some implementations, the processor may include a digital signal processor (DSP). In some implementations, the processor may include an application-specific integrated circuit (ASIC).

The vehicle controller 107 is configured to control the electric drive system 102 and the EPB system 103 according to a driving instruction. The driving instruction includes a brake instruction, a park instruction, an unpark (e.g., drive) instruction, and the like.

For example, the new energy vehicle 1000 further includes a driving braking system 108 configured to perform driving braking. The driving braking system 108 includes a brake pedal (not shown in the figure), a sensor disposed on the brake pedal, and a brake execution unit. A user (such as a driver) may perform a braking operation by depressing the brake pedal. The sensor on the brake pedal generates a brake instruction in response to the braking operation of the user. The vehicle controller 107 sends a braking signal to the drive motor 1021 according to the brake instruction. The drive motor 1021 stops rotating based on the braking signal, the brake execution unit brakes the wheel 1025, the wheel 1025 stops rotating, and the new energy vehicle 1000 parks. It may be understood that, in this disclosure, the user is not limited to depressing the brake pedal to perform the braking operation, and the user may perform the braking operation on the new energy vehicle 1000 by using another device in another manner. In some implementations, the new energy vehicle 1000 further includes a sensing system (not shown in the figure). The vehicle controller 107 of the new energy vehicle 1000 may also park after performing parsing based on information and data collected by the sensing system of the new energy vehicle 1000. For example, when determining, based on the information collected by the sensing system, that an emergency (such as a suddenly burst pedestrian) occurs in a driving direction, the vehicle controller 107 controls the new energy vehicle 1000 to automatically park.

For example, the EPB system 103 further includes a parking button that is communicatively connected to the vehicle controller 107. The user may press the parking button to perform the parking operation, and the parking button generates a park instruction in response to the parking operation of the user. The vehicle controller 107 sends a parking signal to the EPB control module 1035 and the automatic gear shifting control module 1027 according to the park instruction. The EPB control module 1035 controls, based on the parking signal, the parking drive unit 1036 to drive the parking brake execution unit 1038 to clamp the wheel 1025, to implement an EPB function. It may be understood that, in this disclosure, the user is not limited to performing the parking operation by using the parking button, and the user may perform the parking operation on the new energy vehicle 1000 by using another device in another manner. The automatic gear shifting control module 1027 controls, based on the parking signal, the gear shifting apparatus 1023 to enter the self-locking state, so that the wheel 1025 cannot move, and an electronic parking function of the gear shifting apparatus 1023 is implemented. Therefore, dual insurance is provided for the new energy vehicle 1000 when parking. Because there is no need to add an additional parking structure, and an additional electronic parking function is implemented by using the gear shifting apparatus 1023, space occupied by the EPB system 103 is reduced, and lightweight development of the new energy vehicle 1000 is facilitated. In some implementations, the new energy vehicle 1000 further includes a sensing system (not shown in the figure). The vehicle controller 107 of the new energy vehicle 1000 may also automatically park after performing parsing based on information and data collected by the sensing system of the new energy vehicle 1000.

When the new energy vehicle 1000 needs to unpark, the user performs an unparking operation on the new energy vehicle 1000. For example, the user may perform the unparking operation by pressing the parking button, and the parking button generates an unpark instruction in response to the unparking operation of the user. The vehicle controller 107 sends an unparking signal to the EPB control module 1035 and the automatic gear shifting control module 1027 according to the unpark instruction. The EPB control module 1035 controls, based on the unparking signal, the parking drive unit 1036 to drive the parking brake execution unit 1038 to release the wheel 1025, so that the new energy vehicle 1000 unparks.

A structure of the gear shifting apparatus 1023 is further described below with reference to the accompanying drawings.

Figure 3:
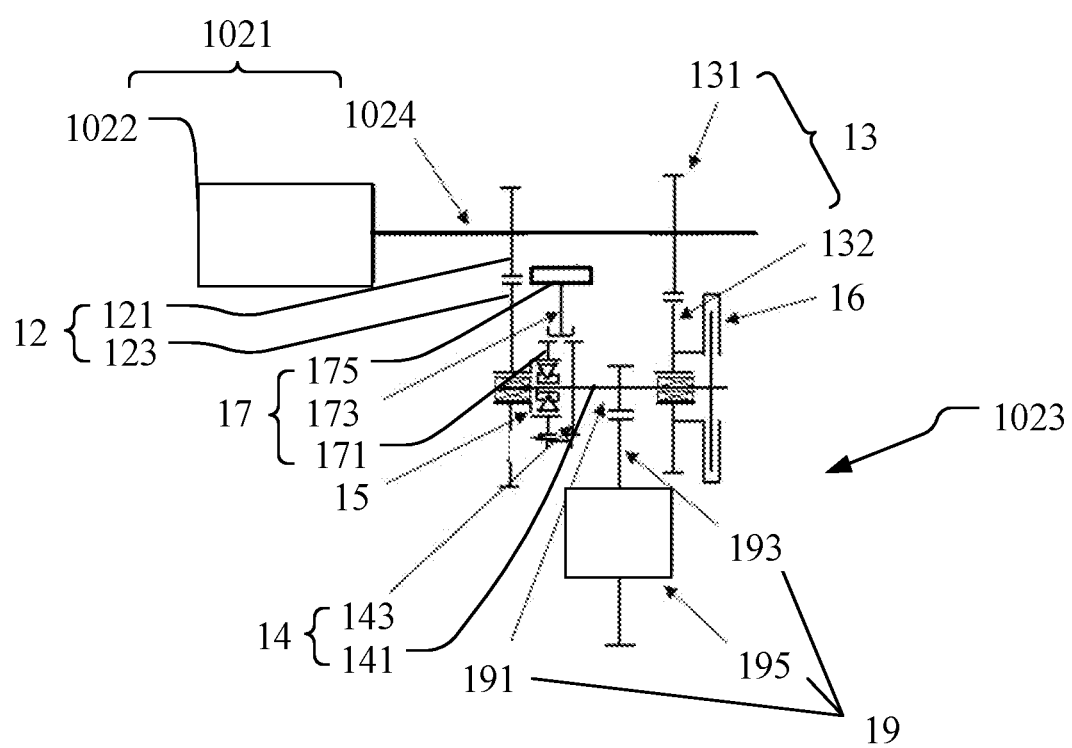
FIG. 3 is a schematic diagram of a connection between a gear shifting apparatus and a drive motor according to a first implementation of this disclosure.

In an example, referring to FIG. 3, the gear shifting apparatus 1023 includes a primary power transmission unit 12, a secondary power transmission unit 13, an intermediate shaft 141, an intermediate shaft gear 143, a first clutch unit 15, a second clutch unit 16, a third clutch unit 17, and a differential unit 19. The drive motor 1021 includes a drive body 1022 and an input shaft 1024. The drive body 1022 is configured to drive the input shaft 1024 to rotate. The primary power transmission unit 12 is connected to the input shaft 1024 for power transmission. The secondary power transmission unit 13 is connected to the input shaft 1024 for power transmission. The intermediate shaft gear 143 is fixedly sleeved on the intermediate shaft 141. The first clutch unit 15 is disposed between the intermediate shaft 141 and the primary power transmission unit 12, and the first clutch unit 15 is configured to achieve or break power transmission between the intermediate shaft 141 and the primary power transmission unit 12. The second clutch unit 16 is disposed between the intermediate shaft 141 and the secondary power transmission unit 13, and the second clutch unit 16 is configured to achieve or break power transmission between the intermediate shaft 141 and the secondary power transmission unit 13. The third clutch unit is disposed between the intermediate shaft gear 143 and the primary power transmission unit 12, and is configured to achieve or break power transmission between the intermediate shaft gear 143 and the primary power transmission unit 12.

When the gear shifting apparatus 1023 is in the self-locking state, the intermediate shaft 141 cannot rotate, and the gear shifting apparatus 1023 cannot transmit power of the drive motor 1021 to the wheel 1025. When the gear shifting apparatus 1023 is in the non-self-locking state, the intermediate shaft 141 can rotate, and the gear shifting apparatus 1023 can transmit power of the drive motor 1021 to the wheel 1025. When the automatic gear shifting control module 1027 receives the parking signal, the automatic gear shifting control module 1027 controls the gear shifting apparatus 1023 to enter the self-locking state. When the automatic gear shifting control module 1027 receives the unparking signal, the automatic gear shifting control module 1027 controls the gear shifting apparatus 1023 to enter the non-self-locking state.

In this implementation, when the first clutch unit 15 achieves power transmission between the intermediate shaft 141 and the primary power transmission unit 12, the second clutch unit 16 achieves power transmission between the intermediate shaft 141 and the secondary power transmission unit 12, and the third clutch unit 17 achieves power transmission between the intermediate shaft gear 143 and the primary power transmission unit 12, a transmission ratio obtained when the third clutch unit 17 is combined with the intermediate shaft gear 143 is different from a transmission ratio obtained when the second clutch unit 16 is combined with the intermediate shaft 141, and the gear shifting apparatus 1023 is in the self-locking state. After the vehicle controller 107 sends a parking signal to the EPB control module 1035 and the automatic gear shifting control module 1027, the automatic gear shifting control module 1027 controls the gear shifting apparatus 1023 to enter the self-locking state.

After the gear shifting apparatus 1023 enters the self-locking state, because the intermediate shaft 141 cannot rotate, the wheel 1025 can be prevented from rotating, and therefore a possibility that the wheel 1025 rotates is reduced. In other words, the gear shifting apparatus 1023 is equivalent to another parking brake system of the new energy vehicle 1000, so that double insurance is provided during parking of the new energy vehicle 1000, and a possibility of occurrence of an accident is reduced. There is no need to add an additional parking mechanism, and the gear shifting apparatus 1023 of the electric drive system 102 and the EPB system 103 of the new energy vehicle 1000 form an EPB redundant system. Therefore, while safety of the new energy vehicle 1000 is improved, a volume occupied by the EPB redundant system can be reduced, and lightweight development of the new energy vehicle 1000 is facilitated.

When the first clutch unit 15 achieves power transmission between the intermediate shaft 141 and the primary power transmission unit 12, the second clutch unit 16 achieves power transmission between the intermediate shaft 141 and the secondary power transmission unit 13, and the third clutch unit 17 is separated from the intermediate shaft gear 143 to break power transmission between the intermediate shaft gear 143 and the primary power transmission unit 12, the gear shifting apparatus 1023 is in the non-self-locking state.

The primary power transmission unit 12 includes a primary power transmission input gear 121 and a primary power transmission output gear 123. The primary power transmission input gear 121 is mounted on the input shaft 1024 and can rotate with the input shaft 1024. It may be understood that the primary power transmission input gear 121 may be directly mounted on the input shaft 1024, or may be indirectly connected to the input shaft 1024 by using a connection mechanism, provided that the primary power transmission input gear 121 can rotate with the input shaft 1024. The primary power transmission output gear 123 meshes with the primary power transmission input gear 121, and is configured to connect to the intermediate shaft 141 for power transmission. Because the primary power transmission unit 12 includes the primary power transmission input gear 121 and the primary power transmission output gear 123, flexibility of internal component layout of the gear shifting apparatus 1023 is improved, and space occupied by the gear shifting apparatus 1023 is reduced.

It may be understood that the primary power transmission output gear 123 in the primary power transmission unit 12 may alternatively be omitted, and the primary power transmission input gear 121 is directly connected to a structure such as the first clutch unit 15.

The secondary power transmission unit 13 includes a secondary power transmission input gear 131 and a secondary power transmission output gear 133. The secondary power transmission input gear 131 is mounted on the input shaft 1024 and can rotate with the input shaft 1024. The secondary power transmission output gear 133 meshes with the secondary power transmission input gear 131, and is configured to connect to the intermediate shaft 141 for power transmission. It may be understood that the secondary power transmission input gear 131 may be directly mounted on the input shaft 1024, or may be indirectly connected to the input shaft 1024 by using a connection mechanism, provided that the secondary power transmission input gear 131 can rotate with the input shaft 1024. Because the secondary power transmission unit 13 includes the secondary power transmission input gear 131 and the secondary power transmission output gear 133, flexibility of internal component layout of the gear shifting apparatus 1023 is improved, and space occupied by the gear shifting apparatus 1023 is reduced.

It may be understood that the secondary power transmission output gear 133 in the secondary power transmission unit 13 may alternatively be omitted, and the secondary power transmission input gear 131 is directly connected to a structure such as the second clutch unit 16.

An intermediate shaft unit 14 further includes a first bearing 145 and a second bearing 147. The intermediate shaft gear 143 is fixedly sleeved on the intermediate shaft 141, and is configured to connect to the differential unit 19. The primary power transmission output gear 123 is rotatably sleeved on the intermediate shaft 141. The first bearing 145 is disposed between the primary power transmission output gear 123 and the intermediate shaft 141, to improve smoothness of relative movement between the primary power transmission output gear 123 and the intermediate shaft 141. The second bearing 147 is disposed between the secondary power transmission output gear 133 and the intermediate shaft 141, to improve smoothness of relative movement between the secondary power transmission output gear 133 and the intermediate shaft 141.

In this implementation, the first clutch unit 15 includes a one-way clutch. The one-way clutch includes an outer ring, an inner ring, and a wedge assembly between the inner ring and the outer ring. The one-way clutch may be braked by using a wedge or a roller. The outer ring is fixedly connected to the primary power transmission output gear 123, and the inner ring is fixedly connected to the intermediate shaft 141. The first clutch unit 15 includes a non-combined state (also referred to as a separated state) and a combined state (also referred to as a still state). When rotating in one direction, the inner ring and the outer ring are not in contact with each other; in other words, the one-way clutch rotates freely, the one-way clutch cannot drive the intermediate shaft 141 to rotate with the primary power transmission output gear 123, and the first clutch unit 15 is in the non-combined state. When rotating in another direction, the inner ring and the outer ring are in close contact. In this case, the one-way clutch may transmit high torque, and the first clutch unit 15 can drive the intermediate shaft 141 to rotate with the primary power transmission output gear 123; in other words, the primary power transmission output gear 123 can transmit power of the input shaft 1024 to the intermediate shaft 141. In other words, when the first clutch unit 15 is in the combined state, the power of the input shaft 1024 can be transmitted to the intermediate shaft 141 by using the primary power transmission output gear 123. It may be understood that a structure of the first clutch unit 15 is not limited in this disclosure, and power transmission between the first clutch unit 15 and the intermediate shaft 141 can be achieved or broken.

In this implementation, the second clutch unit 16 includes one of a friction plate clutch or an electromagnetic clutch. The friction plate clutch includes a driving part, a driven part, a pressing mechanism, and a manipulation mechanism. The driving part, the driven part, and the pressing mechanism are basic structures for ensuring that the friction plate clutch is in a combined state and can transmit power, and the manipulation mechanism of the clutch is mainly an apparatus for separating the friction plate clutch. The electromagnetic clutch is a friction clutch that generates pressing force by electromagnetic force. The electromagnetic clutch is also referred to as an electromagnetic coupling. The electromagnetic clutch is an electromagnetic mechanical connector that enables, by using an electromagnetic induction principle and force of friction between an internal friction plate and an external friction plate, the driven part to be combined with or separated with the driving part while the driving part does not stop rotating, and is an electric apparatus that automatically performs an operation, where the driving part and the driven part are two parts that perform rotation motion in a mechanical power transmission system.

The second clutch unit 16 includes a non-combined state and a combined state. When the second clutch unit 16 is in the non-combined state, the second clutch unit 16 breaks power transmission between the secondary power transmission output gear 133 and the intermediate shaft 141. When the second clutch unit 16 is in the combined state, the second clutch unit 16 connects the secondary power transmission output gear 133 and the intermediate shaft 141, and the second clutch unit 16 achieves power transmission between the secondary power transmission output gear 133 and the intermediate shaft 141. It may be understood that a structure of the second clutch unit 16 is not limited in this disclosure, and power transmission between the second clutch unit 16 and the intermediate shaft 141 can be achieved or broken.

The third clutch unit 17 includes a third clutch 171, an actuator connecting piece 173, and an actuator 175. The third clutch 171 is disposed between the intermediate shaft gear 143 and the primary power transmission output gear 123 of the primary power transmission unit 12. The third clutch 171 is fixedly connected to the primary power transmission output gear 123. The actuator connecting piece 173 is connected to the actuator 175. The actuator 175 is configured to control axial movement of the actuator connecting piece 173 along the intermediate shaft 141, so that the third clutch 171 is combined with the intermediate shaft gear 143 or is separated from the intermediate shaft gear 143. The third clutch 171 includes a non-combined state and a combined state. The third clutch 171 is a toothed clutch. When the third clutch 171 is in the combined state, the third clutch 171 meshes with the intermediate shaft gear 143. When the third clutch 171 is in the non-combined state, the third clutch 171 is separated from the intermediate shaft gear 143. A transmission ratio obtained when the third clutch 171 is combined with the intermediate shaft gear 143 is different from a transmission ratio obtained when the second clutch unit 16 is combined with the intermediate shaft 141. When the new energy vehicle 1000 is in the self-locking state, the third clutch 171 is combined with the intermediate shaft gear 143, and the second clutch unit 16 is combined with the intermediate shaft 141. Because the transmission ratio obtained when the third clutch 171 is combined with the intermediate shaft gear 143 is different from the transmission ratio obtained when the second clutch unit 16 is combined with the intermediate shaft 141, the intermediate shaft 141 cannot move, and power of the input shaft 1024 cannot be transmitted to the differential unit 19 by using the primary power transmission unit 12, the secondary power transmission unit 13, and the intermediate shaft unit 14. Therefore, self-locking of the gear shifting apparatus 1023 is implemented. The actuator 175 may be an electronic button or a mechanical operating piece. It may be understood that a structure of the third clutch unit 17 is not limited in this disclosure, and power transmission between the third clutch unit 17 and the intermediate shaft gear 143 can be achieved or broken.

The differential unit 19 includes a main speed reducer power transmission input gear 191, a main speed reducer power transmission output gear 193, and a differential 195. The main speed reducer power transmission input gear 191 is sleeved on the intermediate shaft 141. The main speed reducer power transmission output gear 193 meshes with the main speed reducer power transmission input gear 191. The differential 195 is connected to the main speed reducer power transmission output gear 193 for power transmission. When the new energy vehicle 1000 is in a driving state, the first clutch unit 15 is in the combined state, the second clutch unit 16 is in the combined state, and the third clutch unit 17 is in the non-combined state. An output shaft of the differential 195 is connected to the wheel 1025.

When the first clutch unit 15 is in the combined state, the first clutch unit 15 is connected between the primary power transmission output gear 123 and the intermediate shaft 141. When the second clutch unit 16 is in the combined state, the second clutch unit 16 is connected between the secondary power transmission output gear 133 and the intermediate shaft 141. When the third clutch unit 17 is in the non-combined state, the third clutch 171 is separated from the intermediate shaft gear 143. The input shaft 1024 of the drive motor 1021 rotates, and the primary power transmission output gear 123 and the secondary power transmission output gear 133 drive the intermediate shaft 141 to rotate. Rotation of the intermediate shaft 141 drives the main speed reducer power transmission output gear 193 and the main speed reducer power transmission input gear 191 to rotate, and the differential 195 drives the wheel 1025 to rotate, to transmit power of the drive motor 1021 to the wheel 1025. When the new energy vehicle 1000 is in a parking state, the intermediate shaft 141 does not rotate, the parking brake execution unit 1038 clamps the wheel 1025, and the gear shifting apparatus 1023 implements self-locking. Therefore, double insurance is provided during parking of the new energy vehicle 1000.

It may be understood that the gear shifting apparatus 1023 is not limited to being applied to the new energy vehicle 1000 in this disclosure, and may also be applied to another device or apparatus, for example, a device such as a robot.

Figure 4:
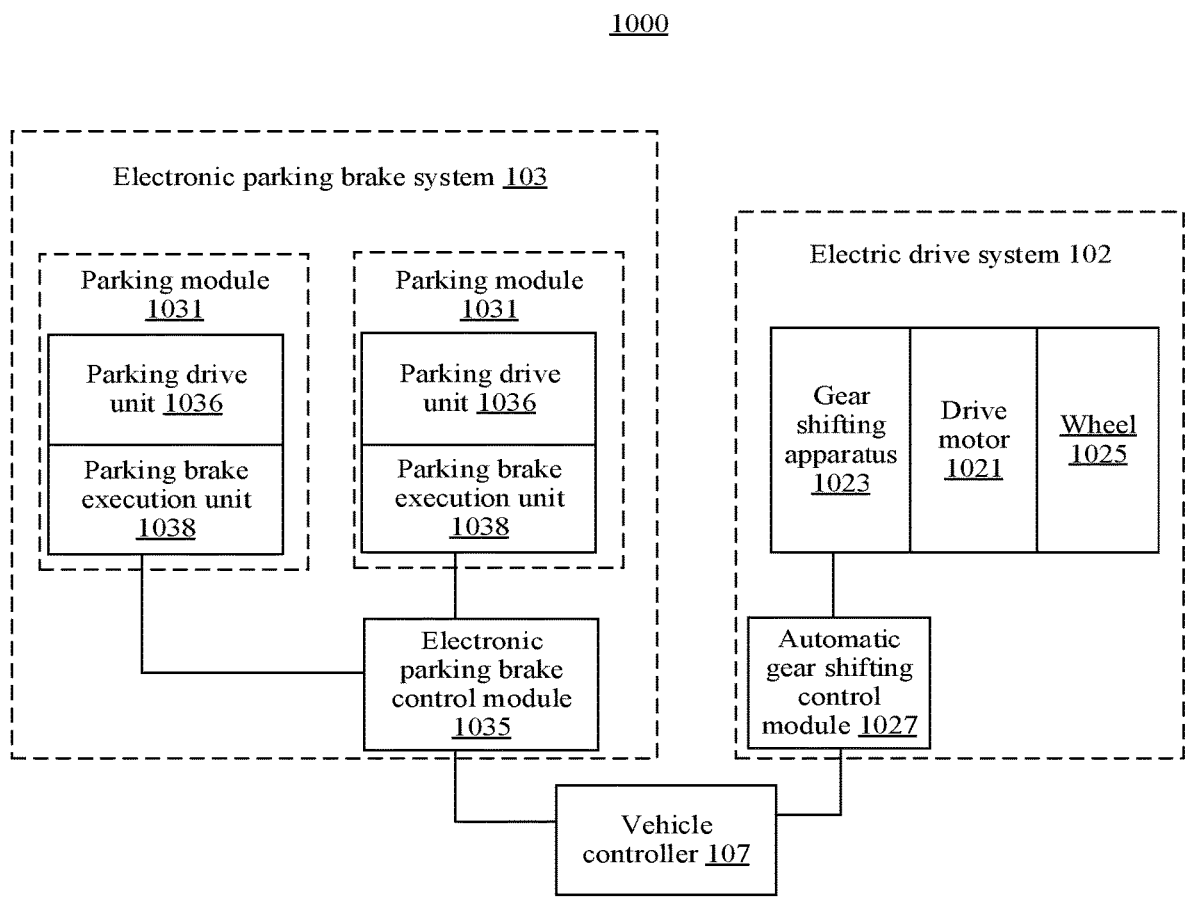
FIG. 4 is a block diagram of a structure of a new energy vehicle according to a second implementation of this disclosure.

Referring to FIG. 4, a structure of a new energy vehicle 1000 provided in a second implementation of this disclosure is basically similar to a structure of the new energy vehicle provided in the first implementation. Differences lie in that there are two parking modules 1031 and one EPB control module 1035, and parking drive units 1036 in both the two parking modules 1031 are communicatively connected to the EPB control module 1035. Because the two parking modules 1031 share one EPB control module 1035, space occupied by the new energy vehicle 1000 is reduced, and costs are reduced.

It should be understood that expressions such as "include" and "may include" that may be used in this disclosure represent the existence of a disclosed function, operation, or constituent element, and do not limit one or more additional functions, operations, and constituent elements. In this disclosure, terms such as "including" and/or "having" may be construed as representing a feature, quantity, operation, constituent element, component, or a combination thereof, but are not construed as excluding the existence or an adding possibility of one or more other features, quantities, operations, constituent elements, components, or combinations thereof.

In addition, in this disclosure, the expression "and/or" includes any and all combinations of listed associated words. For example, the expression "A and/or B" may include A, may include B, or may include both A and B.

In this disclosure, expressions including ordinal numbers such as "first" and "second" may modify each element. However, the element is not limited by the foregoing expression. For example, the foregoing expression does not limit a sequence and/or importance of the elements. The foregoing expression is merely used to distinguish one element from another. For example, first user equipment and second user equipment indicate different user equipment, although both the first user equipment and the second user equipment are user equipment. Similarly, without departing from the scope of this disclosure, a first element may be referred to as a second element, and similarly, a second element may be referred to as a first element.

When a component "is connected to" or "accesses" another component, it should be understood that the component is not only directly connected to or directly accesses the other component but there may also be another component between the component and the other component. In addition, when a component "is directly connected to" or "directly accesses" another component, it should be understood that there is no component between the components.

The foregoing descriptions are merely implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A gear shifting apparatus, comprising:
   a primary power transmission unit;
   a secondary power transmission unit;
   an intermediate shaft;
   an intermediate shaft gear fixedly sleeved on the intermediate shaft;
   a first clutch unit disposed between the intermediate shaft and the primary power transmission unit, wherein the first clutch unit is configured to achieve first power transmission between the primary power transmission unit and the intermediate shaft or break the first power transmission;
   a second clutch unit disposed between the intermediate shaft and the secondary power transmission unit, wherein the second clutch unit is configured to achieve second power transmission between the secondary power transmission unit and the intermediate shaft or break the second power transmission; and
   a third clutch unit disposed between the primary power transmission unit and the intermediate shaft gear, wherein the third clutch unit is configured to achieve third power transmission between the primary power transmission unit and the intermediate shaft gear or break the third power transmission, and
   wherein the gear shifting apparatus is configured to be in a self-locking state when the first clutch unit achieves the first power transmission, the second clutch unit achieves the second power transmission based on combining the second clutch unit with the intermediate shaft gear, and the third clutch unit achieves the third power transmission based on combining the third clutch unit with the intermediate shaft gear.

2. The gear shifting apparatus of claim 1, wherein the gear-shifting apparatus is configured to be in a non-self-locking state when the first clutch unit achieves the first power transmission, the second clutch unit achieves the second power transmission, and the third clutch unit breaks the third power transmission.

3. The gear shifting apparatus of claim 1, wherein the third clutch unit comprises:

a third clutch disposed between the intermediate shaft gear and the primary power transmission unit;
an actuator; and
an actuator connecting piece connected to the actuator, wherein the actuator is configured to control the actuator connecting piece to achieve the third power transmission or to break the third power transmission.

4. The gear shifting apparatus of claim 1, wherein the primary power transmission unit comprises:
a primary power transmission input gear; and
a primary power transmission output gear, wherein the primary power transmission output gear meshes with the primary power transmission input gear, wherein the first clutch unit is disposed between the primary power transmission output gear and the intermediate shaft, and wherein the third clutch is mounted between the primary power transmission output gear and the intermediate shaft gear.

5. The gear shifting apparatus of claim 4, wherein the first clutch unit comprises a one-way clutch, and wherein the one-way clutch is mounted between the primary power transmission output gear and the intermediate shaft.

6. The gear shifting apparatus of claim 3, wherein the third clutch is a toothed clutch, and wherein the actuator is configured to:
control the actuator connecting piece to move in a first axial direction of the intermediate shaft to cause the third clutch to mesh with the intermediate shaft gear and achieve the third power transmission; or
control the actuator connecting piece to move in a second axial direction of the intermediate shaft to cause the third clutch to separate from the intermediate shaft gear and break the third power transmission.

7. The gear shifting apparatus of claim 1, wherein the secondary power transmission unit comprises:
a secondary power transmission input gear; and
a secondary power transmission output gear, wherein the secondary power transmission output gear meshes with the secondary power transmission input gear, and wherein the second clutch unit is disposed between the secondary power transmission output gear and the intermediate shaft.

8. The gear shifting apparatus of claim 7, wherein the second clutch unit comprises a friction plate clutch or an electromagnetic clutch.

9. The gear shifting apparatus of claim 1, wherein the gear shifting apparatus further comprises a differential unit, and wherein the differential unit is connected to the intermediate shaft for power transmission.

10. The gear shifting apparatus of claim 9, wherein the differential unit comprises:
a main speed reducer power transmission input gear sleeved on the intermediate shaft, wherein the main speed reducer power transmission input gear is configured to rotate with the intermediate shaft;
a main speed reducer power transmission output gear configured to mesh with the main speed reducer power transmission input gear; and
a differential connected to the main speed reducer power transmission output gear for power transmission.

11. The gear shifting apparatus of claim 1, wherein a first transmission ratio is obtained when the third clutch unit is combined with the intermediate shaft gear, wherein a second transmission ratio is obtained when the second clutch unit is combined with the intermediate shaft gear, and wherein the first transmission ratio is different than the second transmission ratio.

12. An electric drive system, comprising:
a drive motor comprising:
an input shaft; and
a drive body configured to drive the input shaft to rotate; and
a gear shifting apparatus comprising:
a primary power transmission unit connected to the input shaft, wherein the input shaft is configured for power transmission to the primary power transmission unit;
a secondary power transmission unit connected to the input shaft, wherein the input shaft is configured for power transmission to the secondary power transmission unit;
an intermediate shaft;
an intermediate shaft gear fixedly sleeved on the intermediate shaft;
a first clutch unit disposed between the intermediate shaft and the primary power transmission unit, wherein the first clutch unit is configured to achieve first power transmission between the primary power transmission unit and the intermediate shaft or break the first power transmission;
a second clutch unit disposed between the intermediate shaft and the secondary power transmission unit, wherein the second clutch unit is configured to achieve second power transmission between the secondary power transmission unit and the intermediate shaft or break the second power transmission; and
a third clutch unit disposed between the primary power transmission unit and the intermediate shaft gear, wherein the third clutch unit is configured to achieve third power transmission between the primary power transmission unit and the intermediate shaft gear or break the third power transmission, and wherein the gear shifting apparatus is in a self-locking state when the first clutch unit achieves the first power transmission, the second clutch unit achieves the second power transmission based on combining the second clutch unit with the intermediate shaft gear, and the third clutch unit achieves the third power transmission based on combining the third clutch unit with the intermediate shaft gear.

13. The electric drive system of claim 12, wherein the gear shifting apparatus is in a non-self-locking state when the first clutch unit achieves the first power transmission, the second clutch unit achieves the second power transmission, and the third clutch unit breaks the third power transmission.

14. The electric drive system of claim 12, wherein the third clutch unit comprises:
a third clutch disposed between the intermediate shaft gear and the primary power transmission unit;
an actuator; and
an actuator connecting piece coupled to the actuator, wherein the actuator is configured to control the actuator connecting piece to achieve the third power transmission or to break the third power transmission.

15. The electric drive system of claim 12, wherein the primary power transmission unit comprises:
a primary power transmission input gear; and
a primary power transmission output gear, wherein the primary power transmission output gear meshes with the primary power transmission input gear, wherein the first clutch unit is disposed between the primary power transmission output gear and the intermediate shaft, and wherein the third clutch is mounted between the primary power transmission output gear and the intermediate shaft gear.

16. The electric drive system of claim 15, wherein the first clutch unit comprises a one-way clutch, and wherein the one-way clutch is mounted between the primary power transmission output gear and the intermediate shaft.

17. A new energy vehicle, comprising:
an electric drive system comprising:
  a drive motor comprising:
    an input shaft; and
    a drive body configured to drive the input shaft to rotate;
  a gear shifting apparatus, comprising:
    a primary power transmission unit connected to the input shaft, wherein the input shaft is configured for power transmission to the primary power transmission unit;
    a secondary power transmission unit connected to the input shaft, wherein the input shaft is configured for power transmission to the secondary power transmission unit,
    an intermediate shaft,
    an intermediate shaft gear fixedly sleeved on the intermediate shaft,
    a first clutch unit disposed between the intermediate shaft and the primary power transmission unit, wherein the first clutch unit is configured to achieve first power transmission between the primary power transmission unit and the intermediate shaft or break the first power transmission;
    a second clutch unit disposed between the intermediate shaft and the secondary power transmission unit, wherein the second clutch unit is configured to achieve second power transmission between the secondary power transmission unit and the intermediate shaft or break the second power transmission; and
    a third clutch unit disposed between the primary power transmission unit and the intermediate shaft gear, wherein the third clutch unit is configured to achieve third power transmission between the primary power transmission unit and the intermediate shaft gear or break the third power transmission;
  an automatic gear shifting controller; and
  a wheel, wherein the intermediate shaft is connected to the wheel for power transmission to the intermediate shaft;
  an electronic parking brake system comprising an electronic parking brake controller; and
  a vehicle controller, wherein the vehicle controller is communicatively connected to the automatic gear shifting controller and to the electronic parking brake controller, wherein the vehicle controller is configured to send a parking signal to the automatic gear shifting controller to enable the gear shifting apparatus to enter a self-locking state and to control the electronic parking brake system to apply braking force to the wheel, and
  wherein the gear shifting apparatus is in a self-locking state when the first clutch unit achieves the first power transmission, the second clutch unit achieves the second power transmission based on combining the second clutch unit with the intermediate shaft gear, and the third clutch unit achieves the third power transmission based on combining the third clutch unit with the intermediate shaft gear.

18. The new energy vehicle of claim 17, wherein the gear shifting apparatus is in a non-self-locking state when the first clutch unit achieves the first power transmission, the second clutch unit achieves the second power transmission, and the third clutch unit breaks the third power transmission.

19. The new energy vehicle of claim 17, wherein the third clutch unit comprises:
  a third clutch disposed between the intermediate shaft gear and the primary power transmission unit;
  an actuator; and
  an actuator connecting piece is connected to the actuator, wherein the actuator is configured to control the actuator connecting piece to achieve the third power transmission or break the third power transmission.

20. The new energy vehicle of claim 17, wherein the primary power transmission unit comprises:
  a primary power transmission input gear; and
  a primary power transmission output gear, wherein the primary power transmission output gear meshes with the primary power transmission input gear, wherein the first clutch unit is disposed between the primary power transmission output gear and the intermediate shaft, and wherein the third clutch is mounted between the primary power transmission output gear and the intermediate shaft gear.

* * * * *